Dec. 10, 1935.  W. KLOCKE ET AL  2,023,597
FLUID CONTROLLED CLUTCH AND BRAKE MECHANISM FOR PRESSES AND OTHER MACHINERY
Filed May 15, 1935  3 Sheets-Sheet 1
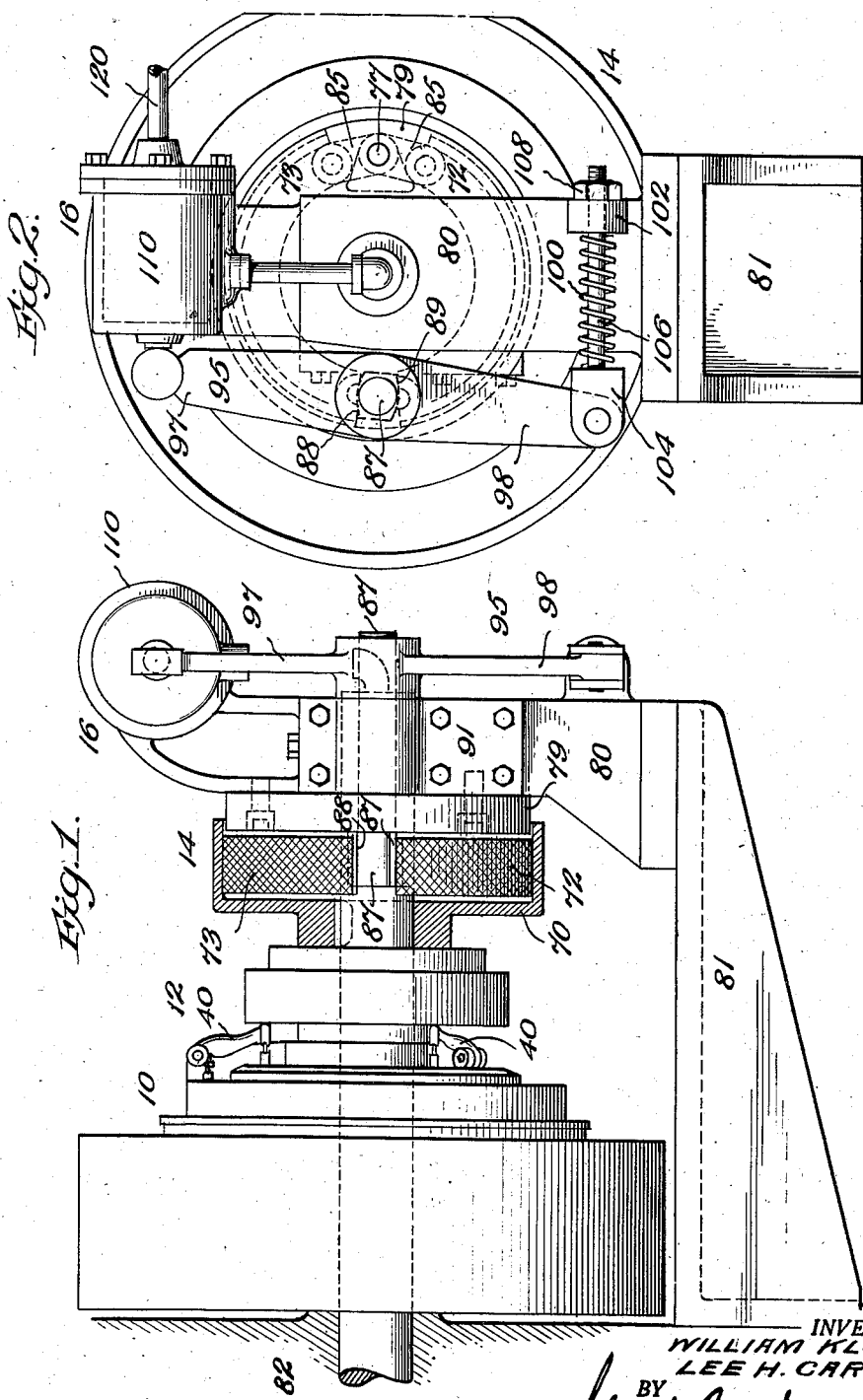
INVENTORS
WILLIAM KLOCKE
LEE H. CARTER
BY
ATTORNEY

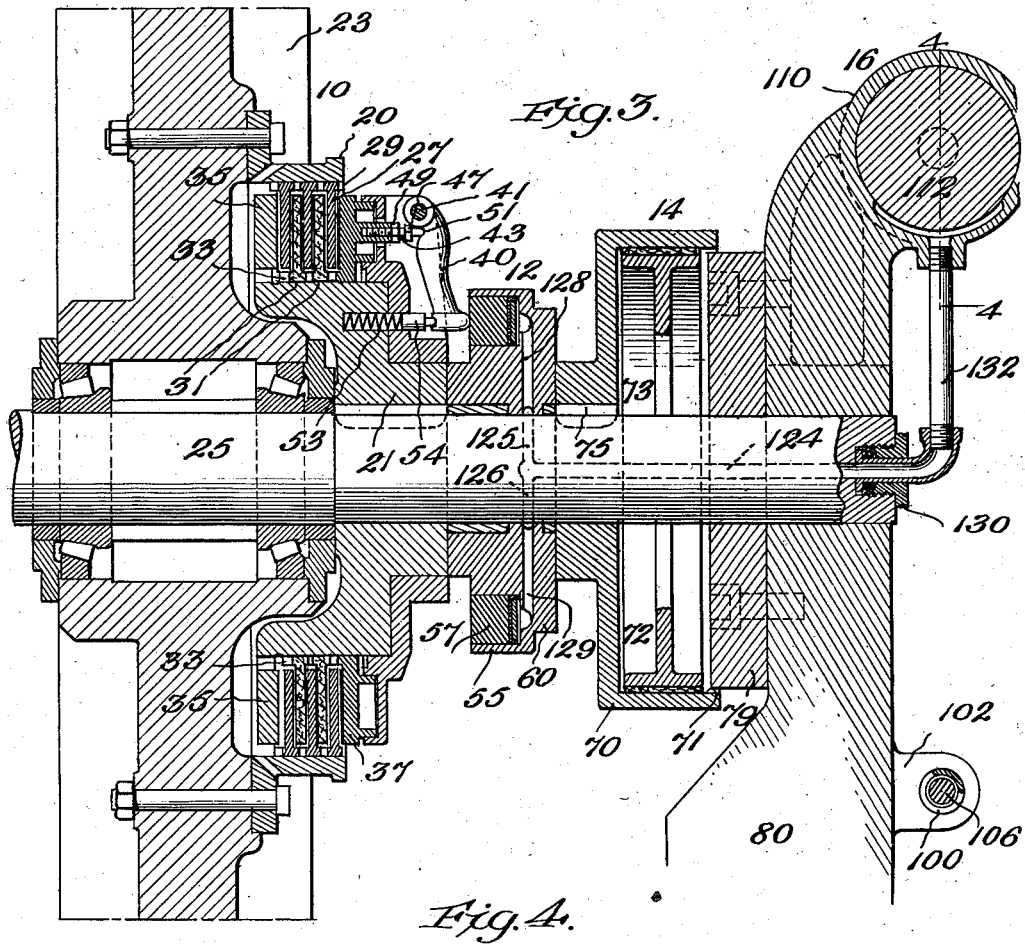

Patented Dec. 10, 1935

2,023,597

UNITED STATES PATENT OFFICE 2,023,597

FLUID CONTROLLED CLUTCH AND BRAKE MECHANISM FOR PRESSES AND OTHER MACHINERY

William Klocke, Woodhaven, N. Y., and Lee H. Carter, Cleveland, Ohio

Application May 15, 1935, Serial No. 21,552

15 Claims. (Cl. 192—12)

This invention relates to fluid controlled clutch and brake mechanisms for presses and other machinery, and provides improvements therein.

The present invention provides a mechanism of the character described in which the clutch and the brake mechanisms will operate properly and in proper sequence at all times, even when there has been considerable wear on the parts of the clutch or brake, or both.

The invention also provides improvements in respect to the simplicity and compactness of the mechanism, particularly of the coordinating parts, and in respect to the satisfactory and reliable operation of the mechanism.

Several embodiments of the invention are illustrated in the accompanying drawings, wherein:

Fig. 1 is a front elevation (with parts in section) of one embodiment of the mechanism shown as applied to a press having a fly-wheel pulley mounted outside of one of the side members of the press frame;

Fig. 2 is an end view of the parts shown in Fig. 1;

Fig. 3 is a longitudinal vertical sectional view of the parts shown in Fig. 2;

Fig. 4 is a longitudinal vertical sectional view on the line 4—4, Fig. 3;

Figure 5:
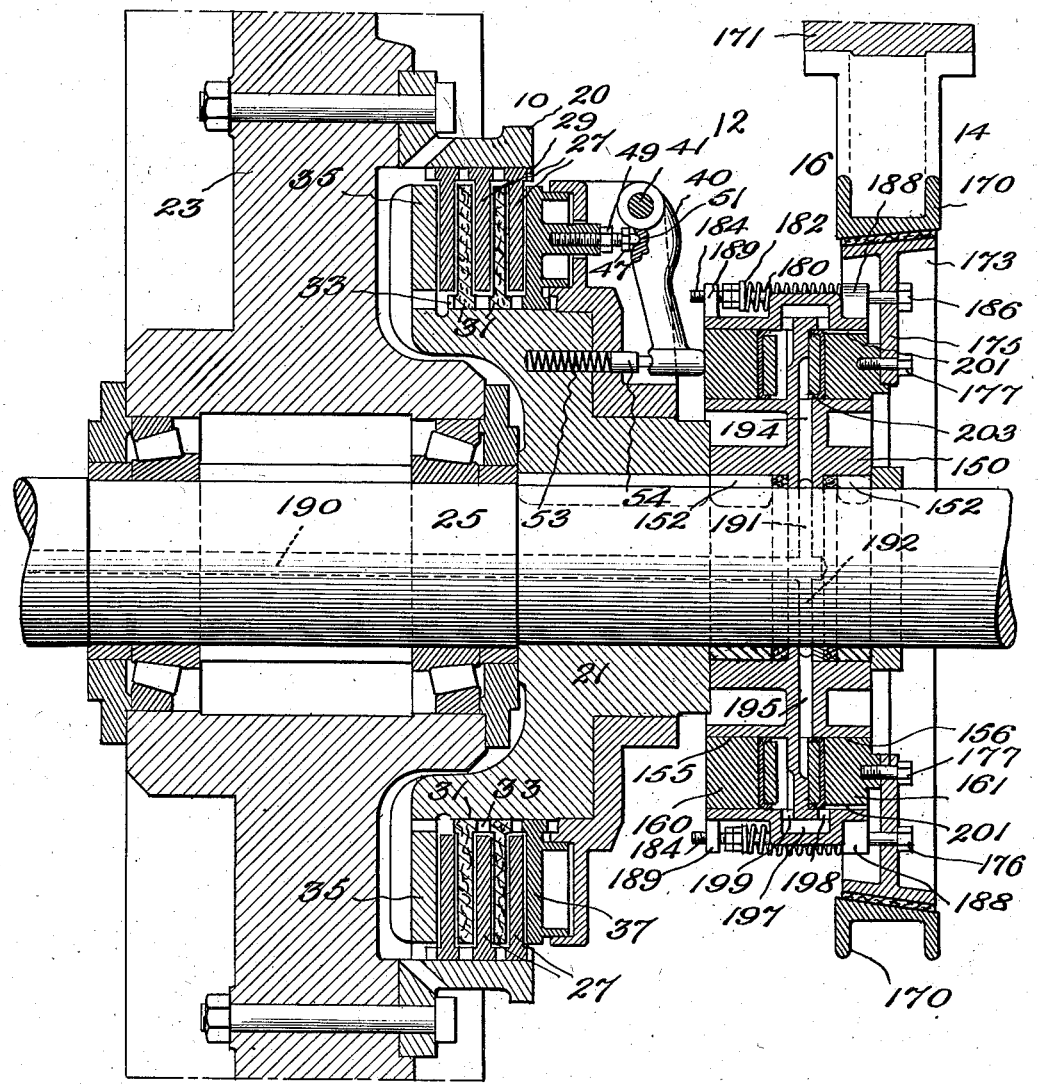
Fig. 5 is a longitudinal vertical sectional view of a second embodiment, the mechanism being shown as applied to a press having a fly-wheel pulley mounted on a shaft between its bearings.

Referring to said drawings, numeral 10 designates a clutch; 12 a pneumatic motor for operating the clutch; numeral 14 a brake and numeral 16 a pneumatic motor for operating the brake. The clutch 10 comprises a driving part 20 and a driven part 21. As here shown, the driven part 21 is fixed to a shaft 25, as the back-shaft of a press, on which shaft the fly-wheel pulley 23 is rotatably mounted. The clutch 10 may be of any suitable construction. It is preferably of the interleaved disk type, as shown. The driving part 20 comprises a plurality of notched annular disks 27, which disks are keyed to the driving part, in such manner as to rotate therewith, by keys 29 which slidably fit in the notches in the said disks 27. The driven part 21 of the clutch has thereon a plurality of notched annular disks 31, which are interleaved with the disks 27, and the disks 31 are keyed to the driven part 21 so as to move therewith, by means of keys 33 which fit slidably in the notches in said disks 31. One of the parts, as the driven part 21, has thereon a flange or abutment 35 against which the interleaved series of plates may be pressed. Opposite the flange 35, at the opposite side of the series of interleaved plates, is a follower or pressure shoe 37 through which pressure may be applied to the series of interleaved disks, so as to lock them together by friction and thereby lock or engage the driving and driven parts 20, 21 of the clutch. As here shown, the follower 37 may have the form of an annular plate having notches which fit the keys 33.

Force is applied by the clutch motor 12 to the follower 37 in any desired manner. Novel means for this purpose are illustrated in Figs. 1, 3 and 5. As here shown, the driven part 21 has a plurality of levers 40 pivotally mounted thereon as indicated at 41. The ends of the levers 40 are acted on by the clutch motor 12. A plurality of these levers 40, usually three, is provided. The levers 40 contact with and apply force to the follower 37 through adjustable studs 43, the adjustable feature being provided by threading the stud and threading the hole in the follower 37 in which the stud fits, as indicated at 45. The studs 43 are provided with nuts 47 by which they may be turned, and also with nuts 49 by which the above threaded studs may be bound against the threads which they engage. By adjusting the position of the studs 43 with relation to the levers 40 wear between the interleaved disks 27 and 31 may be readily compensated for. The studs 43 preferably engage recesses 51 in the levers 40, close to the pivotal bearing 41 of the levers. Springs 53 and blocks 54 which engage the levers 40 may be provided for pressing the levers away from the follower 37 when the clutch motor 12 ceases to apply force to the levers 40 and thereby relieve the interleaved disks 27 and 31, and the follower 37, of the force applied by the motor.

The clutch motor 12 comprises a cylinder 55 and a piston 57, either one of which may be movable with respect to the others. As here shown, the piston 57 is the movable part. The cylinder 55 and the piston 57 encircle the shaft 25, and the arrangement is preferably such that the piston 57 makes contact directly with the ends of the levers 40. The cylinder 55 is conveniently formed as an annular groove in a disk 60 mounted on the shaft 25, and the piston 57 is formed as an annular ring or part fitting into said annular groove forming the cylinder 55. In this embodiment of the invention it is immaterial whether or not the disk 60 be keyed to the shaft 25.

The brake 14 may be of any suitable type. In the embodiment illustrated in Figs. 1, 2 and 3, it comprises a drum 70 having an internal bearing or friction surface 71, and a ring of brake shoes 72, 73 constructed and arranged to be moved into and out of frictional contact with the friction surface 71 of the drum 70. The drum 70 of the brake is fixed to the shaft 25, as by means of a key 75.

The brake shoes 72, 73 are anchored to a fixed part of the press, as for example, to a pin 77 on a disk 79 fastened to a bracket 80 fastened on a shelf 81 fastened to one of the side members 82 of the press frame. The brake shoes 72, 73 may be connected to the pin 77 by means of links 85. The ring of brake-shoe 72, 73 may be expanded into contact with the brake drum 70 by means of a short shaft 87 having oppositely acting cams 88, 89 thereon. The cams 88, 89 engage the ends of the brake-shoes 72, 73, and the strain on the cam shaft 87 due to the reaction between the shoes and the brake drum 70 when the brake is applied, is sustained by the disk 79 through which the said cam shaft 87 passes. A bearing 91, on bracket 80, for the camshaft 87 may be provided if desired. For operating the cam-shaft 87 there may be fixed thereon a lever 95 having two arms 97, 98. The lever 95 is constantly acted on by force tending to rotate the cam shaft 87 in a direction to apply the brake-shoes to the brake-arm 70. As here shown the arm 98 of the lever is constantly acted upon by a spring 100, which spring at one end reacts against an abutment 102 on the bracket 80 and at its other end against a fork 104 pivotally attached to the arm 98 of the said lever 95. The fork 104 may have a guide rod 106 thereon which passes through the spring 100 and through the abutment 102. The movement of the lever 95 may be limited by a nut 108 on the end of the guide-rod 106.

The arm 97 of the lever 95 is acted upon by the brake motor 16 in a direction to release the brake.

The brake motor 16 comprises a cylinder 110 and a piston 112. The piston 112 has a rod 114 thereon which projects through the casing of the cylinder, and the cylinder is preferably so mounted that the arm 97 of the lever 95 is in the path of movement of said rod 114 carried by the piston 112. As here shown the motor 16 and its cylinder 110 are mounted on the bracket 80, which as heretofore described, is supported by a fixed part of the press.

Means are provided for conducting motive-fluid successively to the clutch motor 12 and to the brake motor 16 in quick succession, in such manner that the brake motor acts to release the brake as the clutch motor acts to engage the driving and driven parts 20, 21 of the clutch 10, and also in such manner that the release of the brake is assured upon the engagement of the parts of the clutch 10, and preferably slightly or momentarily in advance of the engagement of the parts of the clutch; and also throughout the engagement of the parts of the clutch. To this end the motive-fluid is preferably conducted to the clutch motor 12 through the cylinder of the brake-motor 16. In this way the pressure in the cylinder of the brake motor 16 will not be less than the pressure within the cylinder of the clutch motor 12.

In the embodiment illustrated in Figs. 1 to 4 inclusive, the means for conducting motive fluid successively to the brake motor 16 and to the clutch motor 12 comprises a duct 120 opening into the cylinder 110 of the motor 16 through a port 122, and a duct leading from the cylinder of motor 10 to the cylinder of clutch motor 12, which duct may comprise a part 124 bored axially of the shaft 124, and having one or more branches 125, 126 connecting with one or more ducts 128, 129, in the disk 60 opening into the annular cylinder 55 of the said clutch motor 12. The duct 124 in the shaft 25 may connect through a swivel joint 130 with a duct 132 which communicates with an outlet opening or port 134 in the cylinder 110 of the brake motor 16. The port 134 is preferably elongated or bifurcated as shown, so that one part is covered and the other part is uncovered by the piston 112 in each of its end positions. That is, the part 135 of the port 134 is covered and the part 136 is uncovered by the piston 112, in the position shown in Fig. 4, which position corresponds to the position of the piston when the piston 112 is not acted upon by the motive fluid; and the part 135 of the port 134 is open and the part 136 is closed by the piston 112 when the said piston is acted upon by motive fluid admitted to the cylinder 110. The cylinder 110 is also provided with a vent 140 which is so located as to be open when the part 136 of the port 134 is uncovered by the piston 112.

Referring to the embodiment shown in Fig. 5 the clutch 10 may be of the same type and construction as that described in reference to Figs. 1 to 4 inclusive. In Fig. 5 the clutch motor 12 and the brake motor 16 are juxtaposed, and the parts of the brake motor 16 made so as to encircle the shaft 25 similar to the parts of the clutch motor 12. Furthermore, as illustrated in said Fig. 5, the parts of the two motors 12 and 16 may be formed in and upon a unitary part mounted upon and attached to the shaft 25. Referring to Fig. 5, numeral 150 designates a block or disk 10 mounted on the shaft 25 and fixed to it as by means of a key or keys 152. The cylinders of the motors 12 and 16 may be annular and be formed by annular grooves 155, 156 in opposite faces of the block or disk 150. The clutch motor 12 has an annular piston 160 which fits into the annular cylinder 155; and the brake motor 16 has an annular piston 161 which fits into the annular cylinder 156. The pistons 160 and 161 are arranged to move in opposite directions. However the movable parts of the motors may be the cylinders or the pistons as may be desired. The brake 14 may have any suitable form. A form which provides a very simple and compact assembly is illustrated, and comprises a drum 170 attached to a fixed part of the press as indicated at 171, which drum has a conical friction surface. A brake shoe 173 may be connected directly to the piston 161 of the brake motor 16, as by means of a flange 175 which is fastened to the piston 161 by means of bolts 177.

The brake shoe 173 is acted on in a direction to constantly apply the brake by suitable means, as for example, a set of springs 180 reacting at one end against a nut 182 on a bolt 184 attached to the flange 175 of the brake shoe 173 as indicated at 186. The springs 180 may react at their other ends against an abutment 188 on the block 150. The bolts 184 pass through the abutment 188 and also through lugs 189, and are guided thereby. The bolts 184 and the abutments 188 and the lugs 189 prevent the brake shoe 173 from turning, and these in turn prevent the pistons 161 from turning.

The relative operation of the motors 12 and 16 is the same as that heretofore described in reference to the embodiment illustrated in Figs. 1 to 4. The means for conducting motive fluid successively to the brake motor and to the clutch motor in quick succession comprises a duct 190 bored in the axis of the shaft 125 and one or more radial or branch ducts 191, 192 communicating with one or more ducts 194, 195 in the block 150 leading into the annular cylinder 156 of the brake motor 16. The interior of the cylinder 155 of the clutch motor 12 is connected with the interior of the cylinder 156 of the motor 16 through a duct 197. The cylinder 156 has a port 198 opening into said duct 197 and the cylinder 155 has a port 199 opening into said duct 197. The port 198 is located in the cylinder 156 in such position as to be covered by the piston 161 in the position which the said piston occupies when the cylinder 156 is relieved of the pressure of the motive fluid; and said port 198 is uncovered by the piston 161 when motive fluid is admitted to the cylinder 156, so as to allow the passage of motive fluid through the port 198, duct 197, and port 199, into the cylinder 155 behind the piston 166 of the clutch motor 12.

A vent 201 is also provided. This vent may have the form of a groove 201 cut across the piston 161 behind the packing 203. The length of the groove 201 is such that, when the piston 161 is in the position which it occupies when the cylinder 156 is relieved of pressure, the end of the groove 201 communicates with the port 198, and thereby places the cylinder 155 of the clutch motor 12 in communication with the atmosphere through port 199, duct 197, port 198 and vent or groove 201. The packing 203 on the piston 156 covers the port 198 at the time that motive fluid is first admitted to the cylinder 156 of the brake motor, and uncovers said port 198 during its movement under the influence of the motive fluid admitted thereto, thereby admitting motive fluid to the cylinder 155 of the clutch motor 12 through said port 198, when uncovered, duct 197, and port 199.

The springs 53 acting in opposition to the clutch motor 12 are separate from and act independently of the springs 100 (Fig. 2) and 180 (Fig. 5) acting in opposition to the brake motor 16, so that each set of springs may be suited to the work which they are to perform. The springs 53 may be comparatively light and the springs 100 and 180 stronger. When the pressure within the motors 12 and 16 varies, there will be a small reduction in the net force with which the plates 29 and 31 of the clutch 10 are pressed into firm contact, as compared to the reduction in the net force with which the shoe of the brake 14 is held out of contact with the brake drum. The pressure in the cylinders of the motors 12 and 16 may vary through a range permitting considerable movement of the brake-shoes while out of contact with the brake-drums, without lessening the force of the clutch motor 12 exerted on the clutch plates 29, 31, to the extent where slipping occurs. When the pressure of the motive-fluid falls to the extent where the spring of the brake-motor 16 brings the shoes of brake 14 into contact with the brake drum, the piston of motor 16 will have moved to the extent that the clutch motor 12 will be vented (through the brake motor 16) and the parts of the clutch disengaged.

Operation

When the press (or other machine) is not working the brake 14 is applied, the parts of the clutch 10 are disengaged, and the fly-wheel pulley 23 or other driving part turns idly.

To start the working of the press, motive fluid is first admitted to the brake motor 16, to actuate the piston of the motor. The movement of the piston releases the brake 14 against the action of the brake-spring, and at about the same time the piston acts to admit the motive fluid to the clutch motor 12. The clutch motor 12 thereupon acts to engage the driven part 21 of the clutch with the driving part 20, and the shaft 25 is thereupon driven. The brake 14 is disengaged before the clutch motor 12 can act to engage the clutch parts, so that there is no drag of the brake on the clutch.

To stop the operation of the press, the pressure on the motive fluid in the brake-motor 16 is relieved which allows the parts of the brake to move toward the "applied" position. During this movement the piston of the brake motor 16 acts to uncover the vent to the clutch motor 12, and, when the said vent is uncovered, the pressure of the motive fluid in the clutch motor is relieved, and allows the clutch spring to move the parts of the clutch to disengaging position, thus disengaging the driven part 21 from the driving part 20. Contact between the parts of the brake is arranged to take place during the final part of the movement of the piston of the brake motor 16, so that the parts 20, 21 of the clutch may be disengaged before braking force is applied by the brake. The sequence of action between the brake 14 and clutch 10 is rapid and in fact nearly simultaneous.

Describing the operation in greater detail with reference to the several embodiments, and first in respect to the embodiment illustrated in Figs. 1 to 4 inclusive; to start the operation of the press, motive fluid is admitted to the cylinder 110 of the brake-motor 16 from duct 120 through a suitable valve (not shown) in said duct. The motive fluid forces the piston 112 to the left (Fig. 4) causing the rod 114 on the piston to turn the brake lever 95 against the action of the spring 100. The turning of the brake lever 95 rotates the cams 88 in a direction to collapse the ring of brake shoes 72, 73, thus in the latter part of the movement of the piston 112 releasing the brake drum 70 from the braking action of shoes 72, 73. The movement of piston 112 as just described covers the branch 136 of the port 134 and uncovers the branch 135. When the branch 135 is uncovered, motive fluid is admitted to the cylinder 55 of the clutch motor 12 through the ducts 132, 124 and branches 125, 126, 128, 129. The motive fluid when it is admitted to the cylinder 55 moves the piston 57 and the clutch levers 40, which clutch levers act to press together the interleaved disks 27, 31 (carried by the driving and driven parts 20, 21 respectively of the clutch 10), through the follower plate 37 and the studs 43 on the follower plate which project into contact with the clutch levers 40. At this time the brake 14 is released and the driven part 21 is engaged with the driving part 20 of the clutch 10.

To stop the operation of the press, the pressure of the motive fluid in the cylinder 110 of the brake motor 16 is relieved (as by opening a vent in a valve, not shown, in the duct 120) whereupon the piston 112 moves to the right, in its movement closing the branch 135 of the port 134, and opening the branch 136 of said port. When the branch port 136 is uncovered, which just precedes the contact of the brake shoes 72, 73 with the drum 70 through the action of the spring 100, the pressure of the motive fluid in the cylinder 55 is relieved (through vent 140), and allows the piston 57 and the clutch levers 40 to move to the right under the action of the springs 53. The pressure exerted on the interleaved disks 27, 31, exerted through the follower 37 is relieved, and the driven part 21 of the clutch 10 is disengaged from the driving part 20. At this time the brake is applied and holds the parts of the press which are driven by the shaft 25, against movement.

Referring to Fig. 5, to start the operation of the press, motive fluid is admitted to the cylinder 156 of the brake motor 16 through the duct 190, (and a valve not shown) branches 91, 92, and 94 and 95. When the motive fluid enters the cylinder 156 of the brake motor 16, the piston 161 is driven to the right against the force of the brake springs 180 moving the brake shoe 173 out of contact with the drum 170, and thereby releasing the brake. As the piston 161 moves to the right, releasing the brake, it uncovers the port 198 and admits motive fluid to the cylinder 155 of the clutch motor 12, through the duct 197 and port 199. Motive fluid on entering the cylinder 155 forces the piston 160 to the left, which movement of the piston 160 turns the clutch levers 40 to cause these to press the interleaved disks 27, 31, together, through the follower 37 and studs 43. When the interleaved disks 27, 31 are forced together the driven part 21 is engaged with the driving part 20 and the press is actuated through the shaft 25.

To stop the operation of the press, the pressure of the motive fluid in the cylinder 156 of the brake motor 16 is relieved, and the springs 180 act to move the brake shoe 173 and the piston 161 to the left. During the movement of the piston 161 to the left, the port 198 is placed in communication with the vent 201 which is provided in the piston behind the packing 203 thereon. The opening of the vent 201 relieves the clutch motor cylinder 155 of the pressure of the motive fluid therein, the motive fluid being vented through the port 199, duct 197, port 198 and vent 201. When the cylinder 155 is relieved of the pressure of the motive fluid as just described, the piston 160 of the clutch motor 12 moves to the right under the action of the springs 53, and these springs 53 also turn the clutch levers 41, and the pressure on the interleaved disks 27, 31, exerted by the clutch levers 40 and follower 37, is relieved, and the driven part 21 of the clutch is disengaged from the driving part 20. At this time the fly wheel pulley 23 may turn freely and idly and the shaft 25 is held against rotation by the frictional contact between the parts 170, 173 of the brake 14.

The invention may receive other embodiments than those herein specifically illustrated and described.

What is claimed is:

1. Fluid controlled clutch and brake mechanism for presses or other machines comprising a clutch having driving and driven parts, a pneumatic motor for operating said clutch, a brake, a pneumatic motor for operating said brake, the relative arrangement and operation of the motors being such that the brake-motor acts to release the brake before the clutch-motor acts to engage the driving and driven parts of the clutch, means for conducting motive-fluid to said brake motor and to said clutch motor, and automatic control means for admitting motive-fluid to the clutch-motor in quick succession to its admission to the brake motor.

2. Fluid controlled clutch and brake mechanism for presses or other machines comprising a clutch having driving and driven parts, a pneumatic motor for operating said clutch, a brake, a pneumatic motor for operating said brake, the relative arrangement and operation of the motors being such that the brake-motor acts to release the brake before the clutch-motor acts to engage the driving and driven parts of the clutch, means for conducting motive-fluid to said brake motor and means controlled by said brake-motor for conducting motive-fluid to said clutch-motor.

3. Fluid controlled clutch and brake mechanism for presses or other machines comprising a clutch having driving and driven parts, a pneumatic motor for operating said clutch, a brake, a spring acting constantly in a direction to apply the brake, a pneumatic motor for operating said brake, against the action of said spring, to release it, means for conducting motive-fluid to said brake-motor and means controlled by said brake motor for conducting motive-fluid to said clutch-motor, the relative arrangement and operation of the motors and brake-spring being such that when the pressure in said conducting means exceeds the pressure of said spring, the brake motor acts to release the brake as the clutch-motor acts to engage the driving and driven parts of the clutch, and when the pressure in said conducting means falls below the pressure of said spring, the said brake-spring acts to apply said brake and the clutch-motor acts to disengage the driving and driven parts of the clutch.

4. Fluid controlled clutch and brake mechanism for presses or other machines according to claim 2, wherein said brake motor comprises a cylinder and piston and wherein said piston acts to control the flow in that part of the motor-fluid conducting means which leads to said clutch-motor.

5. Fluid controlled clutch and brake mechanism for presses or other machines according to claim 2, wherein said brake motor comprises a cylinder and piston and wherein said piston acts to control the flow in that part of the motor-fluid conducting means which leads to said clutch-motor, and wherein that part of the motive-fluid conducting means which leads to said clutch-motor comprises a vent and wherein said brake-motor piston further acts to control the flow through said vent.

6. Fluid controlled clutch and brake mechanism for presses or other machines according to claim 2, wherein said brake-motor comprises a cylinder and piston, said cylinder having a vent, and inlet and outlet ports communicating with that part of the motive fluid conducting means which leads to said clutch-motor, and wherein said piston acts to uncover said inlet-port and cover said outlet port when motive-fluid is admitted to said cylinder, and, when motive-fluid is discharged from said cylinder, covers said inlet port and uncovers said outlet port and vent.

7. Fluid controlled clutch and brake mechanism for presses or other machines comprising a shaft, a clutch having driving and driven parts, one of which is fixed to said shaft, a pneumatic motor for operating said clutch comprising a cylinder encircling said shaft, a brake, a pneumatic motor for operating said brake, the relative arrangement and operation of the motors being such that the brake-motor acts to release the brake before the clutch motor acts to engage the driving and driven parts of the clutch, means for conducting motive-fluid to said brake-motor and means controlled by said brake-motor for conducting motive-fluid to said clutch-motor.

8. Fluid controlled clutch and brake mechanism for presses or other machines according to claim 7, wherein said brake-motor is mounted on a fixed part of the press, and wherein said motive-fluid conducting means comprises a duct for conducting motive-fluid to said brake-motor, a duct in said shaft leading into the cylinder of the clutch-motor, and a duct leading from said brake motor and communicating with said duct in said shaft.

9. Fluid controlled clutch and brake mechanism for presses or other machines according to claim 7, wherein said brake-motor is mounted on a fixed part of the press and comprises a cylinder and piston; wherein said motive-fluid conducting means comprises a duct for conducting motive fluid to the cylinder of said brake-motor, a duct in said shaft leading into the cylinder of said clutch-motor, and a duct leading from the cylinder of said brake motor and communicating with said duct in said shaft; and wherein the piston of said brake motor acts to control the flow through said duct which leads from its cylinder and to uncover said latter duct to put it in communication with said duct leading into said brake cylinder subsequent to the admission of motive-fluid to said cylinder.

10. Fluid controlled clutch and brake mechanism for presses or other machines according to claim 7, wherein said brake-motor is mounted on a fixed part of the press and comprises a cylinder and piston; wherein said motive-fluid conducting means comprises a duct for conducting motive fluid to the cylinder of said brake-motor, a duct in said shaft leading into the cylinder of said clutch-motor, and a duct leading from the cylinder of said brake-motor and communicating with said duct in said shaft; and wherein the cylinder of said brake-motor has a vent and the piston of said brake-motor acts to control the flow through said duct which leads from its cylinder, said piston acting in one direction of movement to uncover said latter duct to put it in communication with said duct leading into said brake cylinder subsequent to the admission of motive-fluid to said cylinder, and acting the opposite direction of movement to put said duct which leads from said brake-cylinder into communication with said vent.

11. Fluid controlled clutch and brake mechanism for presses or other machines comprising a shaft, a clutch having driving and driven parts, one of which is fixed to said shaft, a pneumatic motor for operating said clutch, a brake, a pneumatic motor for operating said brake, said clutch and brake motors comprising cylinders and pistons encircling said shaft, the relative arrangement and operation of the motors being such that the brake-motor acts to release the brake before the clutch motor acts to engage the driving and driven parts of the clutch, and means for conducting motive-fluid serially to said brake-motor and from the latter to said clutch-motor.

12. Fluid controlled clutch and brake mechanism for presses or other machines according to claim 11, wherein the cylinders of said clutch and brake-motors have the form of an annular groove.

13. Fluid controlled clutch and brake mechanism for presses or other machines according to claim 11 wherein the movable parts of said clutch and brake motors are arranged to move axially of the shaft in opposite directions.

14. Fluid controlled clutch and brake mechanism for presses or other machines according to claim 11, further comprising a disk fixed with relation to said shaft, and wherein the cylinders and pistons of said clutch and brake motors are in the form of annular parts on said disk.

15. Fluid controlled clutch and brake mechanism for presses or other machines comprising a shaft, a clutch having driving and driven parts, a pneumatic motor for operating said clutch, a brake, a pneumatic motor for operating said brake, said brake and its motor having connected parts encircling the axis of said shaft, the relative arrangement and operation of the motors being such that the brake-motor acts to release the brake before the clutch motor acts to engage the driving and driven parts of the clutch, and means for conducting motive-fluid serially to said brake-motor and from the latter to said clutch-motor.

WILLIAM KLOCKE.
LEE H. CARTER.

DISCLAIMER 2,023,597.—*William Klocke*, Woodhaven, N. Y., and *Lee H. Carter*, Cleveland, Ohio. FLUID CONTROLLED CLUTCH AND BRAKE MECHANISM FOR PRESSES AND OTHER MACHINERY. Patent dated December 10, 1935. Disclaimer filed March 12, 1938, by the patentees.

Hereby disclaim from claim 1 any apparatus in which the admission of motive fluid to the clutch-motor is not controlled by the operation of the brake-motor.

[*Official Gazette April 12, 1938.*]